United States Patent [19]

Hetherington

[11] 4,265,616

[45] May 5, 1981

[54] PROCESS FOR PRODUCING A HEAT-WEAKENED STRIP IN POLYOLEFIN FILM

[75] Inventor: Brian L. Hetherington, Kingston, Canada

[73] Assignee: Du Pont Canada, Inc., Montreal, Canada

[21] Appl. No.: 86,265

[22] Filed: Oct. 18, 1979

[30] Foreign Application Priority Data

Oct. 19, 1978 [CA] Canada .................................. 313759

[51] Int. Cl.³ .............................................. F27B 9/28
[52] U.S. Cl. ....................................... 432/8; 219/384; 219/388
[58] Field of Search ................. 432/8; 83/879, 15, 16; 219/384, 388; 156/271, 497, 499; 93/DIG. 1

[56] References Cited

U.S. PATENT DOCUMENTS

| 2,630,519 | 3/1953 | Gard | 83/16 |
| 4,070,222 | 1/1978 | Olson | 156/497 |

*Primary Examiner*—John J. Camby

[57] ABSTRACT

A continuous process for forming a longitudinal heat-weakened strip in a cross-lapped oriented polyolefin film is disclosed. The process comprises directing heat from two longitudinally aligned sources, to opposing sides of a travelling web of the cross-lapped oriented polyolefin film, to such an extent that the tensile breaking strength at the heat-weakened strip so formed is in the range of 20 to 100 Newtons per centimeter of length of film. The film so formed is particularly useful for packaging slurry explosives.

6 Claims, 1 Drawing Figure

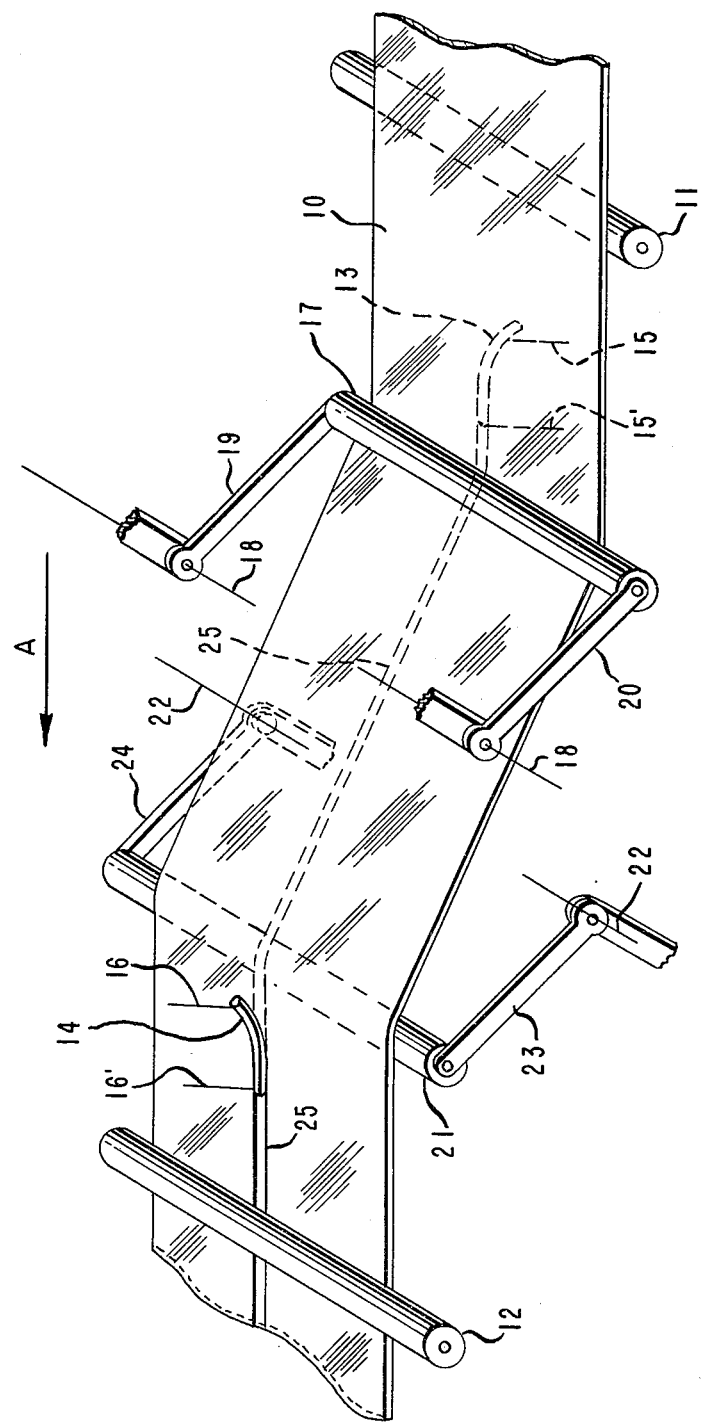

PROCESS FOR PRODUCING A HEAT-WEAKENED STRIP IN POLYOLEFIN FILM

The present invention is directed to a process for providing a longitudinal heat-weakened strip in a web of cross-lapped oriented polyolefin film. The heat weakened cross-lapped oriented polyolefin film is particularly useful for packaging slurry explosives to form a tampable slurry explosives package.

The term "cross-lapped oriented polyolefin film" as used herein means a laminate of a plurality of monoaxially oriented polyolefin films having the orientation directions of adjacent films at an angle to each other.

It is an object of the present invention to provide a process for heat-weakening a longitudinal strip in a cross-lapped oriented polyolefin film, especially in a two-ply cross-lapped oriented polyethylene film.

It is known that orientation of an oriented thermoplastic polymeric film may be destroyed by heating the film to a temperature above the temperature at which the film was oriented.

A method for severing oriented thermoplastic polymeric films and film laminates is disclosed in Canadian Pat. No. 863,812 which issued Feb. 16, 1971 to G. B. Dyer and E. Szpak. A method disclosed by Dyer and Szpak involves subjecting the film laminate to heat and pressure along a desired parting line, to weaken the film, cooling the weakened areas and separating the film at the weakened area by pulling the film on both sides of the line with a snapping action. Weakening of the film laminate by bringing a heated bar, having the shape of the desired parting line, into contact with one side of the film laminate and squeezing the film laminate, while stationary, between the bar and a hard rubber roller is disclosed.

The method disclosed by Dyer and Szpak when adapted to provide a web of film having a heat weakened longitudinal line by a continuous process in which the web is continuously in motion tends to be difficult to control. For example, because of fluctuations in film thickness, heat weakening along the heat-weakened line may be variable to the extent that there may be areas where the film is easily parted at the heat-weakened line and areas where the film, instead of parting along the heat-weakened line tends to rip along the direction of orientation of one of the plies of film which was furthest from the heated bar at the instance of heating.

It is a further object of the present invention to provide an improved process for heat-weakening a longitudinal strip in a cross-lapped oriented polyolefin film.

Accordingly the present invention provides a process for heat-weakening cross-lapped oriented polyolefin film, comprising (a) pulling a web of a cross-lapped oriented polyolefin film, having a thickness between 38 μm and 150 μm, in a longitudinal direction past first and second heat sources (b) directing heat from the first heat source to a transversely narrow area on one side of the film (c) directing heat from the second heat source to a second transversely narrow area on the other side of the film, said second transversely narrow area being longitudinally in line with said first transversely narrow area (d) controlling the heat from the first and second heat sources to effect heat-weakening of the film along a strip passing through the first and second transversely narrow areas to such an extent that the transverse tensile breaking strength at the heat-weakened strip is in the range of 20 to 100 Newtons per centimeter of length of film.

In a preferred embodiment the polyolefin is a polyethylene having a density in the range of 0.935 to 0.970 g/cm$^3$. The film is preferably between 60 μm and 90 μm in thickness. It is preferred that the cross-lapped oriented polyolefin film be a two-ply film.

In another embodiment the first and second transversely narrow areas are between 1.6 and 7.9 mm in width.

In a further embodiment the heat is controlled to such an extent that the transverse tensile breaking strength at the heat-weakened strip is in the range of 25 to 45 Newtons per centimeter and the propagating strength at the heat-weakened strip is in the range of 5 to 15 Newtons per centimeter.

In yet another embodiment the first and second heat sources are heated bars, especially electrically heated bars.

The present invention may be illustrated by reference to FIG. 1 of the drawings which represents a schematic view of a process of the present invention.

The process of the present invention may be carried out using an apparatus comprising an unwind stand, adapted to hold a roll wound with a web of cross-lapped oriented polyolefin film; a rewind stand adapted to pull said web from the unwind stand and wind said web onto a roll on the rewind stand; a tension brake adapted to apply a constant tension to the web as it is pulled from the unwind stand to the rewind stand; a first heating bar adapted to heat a small area of the web as it passes the bar; and a second heating bar adapted to heat the other side of the web as it passes the second heating bar, and positioned at a distance from the first heating bar, wherein the first and second heating bars are aligned parallel to the direction of travel of the web.

Referring to FIG. 1, a web of cross-lapped oriented polyolefin film 10 is pulled in a direction indicated by arrow A, from an unwind stand (not shown), over and under two spaced apart transverse rollers 11 and 12, respectively, to a rewind stand (not shown). The web of film 10 is kept under tension, longitudinally by a tension brake (not shown). As will be understood tensioning may be provided by a brake on the roll of film on the unwind stand, or other known means. Between rollers 11 and 12 are two heating bars 13 and 14 which are spaced apart from and in line with one another along a line parallel to the direction of travel of web 10. Heating bar 13 is on one side of and slightly displaced from a plane through which web 10 passes, between rollers 11 and 12. Heating bar 14 is on the other side of and slightly displaced from the plane. It will be seen therefore that a web of film passing over rollers 11 and 12 would travel therebetween without contacting heating bars 13 and 14, thus preventing "pinholing" or "burn through" of the film.

The terms "pinhole," "pinholing" and "burn through" as used herein refer to the effect of heating the film sufficiently to melt the polyolefin, causing holes to appear at the molten parts.

Heating bars 13 and 14 are connected by pairs of wires 15 and 15' and 16 and 16' respectively to electrical power supply sources (not shown). Each heating bar is curved away from the plane at the tip closest to the unwind stand, to provide a throat so that film passing in contact with the bar will not snag on the tip of the bar.

Two further rollers 17 and 21 on opposing sides of the plane may be pivoted about axes 18 and 22 respectively, and are adapted to be swung about axes 18 and 22 by pairs of arms 19 and 20, and 23 and 24 respectively. Rollers 17 and 21 are adapted to deflect web 10 from said plane between rollers 11 and 12, so that that web 10 comes into contact with heating bars 13 and 14. The pivoting mechanism (not shown) for rollers 17 and 21 is adapted to disengage from web 10 when the web is not in motion, thus causing web 10 to disengage from heating bars 13 and 14.

In operation the web of cross-lapped oriented polyolefin film 10 is wound at a selected rate from the unwind stand to the rewind stand. The web is tensioned by means of the tension brake so that the rewinding takes place smoothly. The heating bars 13 and 14 are subjected to an electrical current, provided by the electrical power sources, thus heating the bars.

Simultaneously rollers 17 and 21 are pivoted about axes 18 and 22 respectively so that web 10 is pushed into contact with heating bars 13 and 14.

The rate of rewinding of the web and the current applied to the heating bars 13 and 14 are adjusted so that the film is weakened along the line passing through the film and in line with the bars. The weakened strip or band is denoted by the numeral 25 in the drawing.

It will be appreciaed by those skilled in the art that relaxation of the orientation and therefore heat-weakening of the oriented film will not occur if the film is heated to a temperature below that at which the film was oriented. It will also be appreciated that the film may "pinhole" or "burn through" if the film is heated above its melting point. It is therefore important in the process of the present invention that the temperature of the bars be above the temperature at which the plies of the cross-lapped oriented polyolefin film were oriented and may be, indeed is preferably above the melting temperature of the polyolefin. It will be understood that if the temperature of the bars is above the melting point of the polyolefin the web must be pulled past the bars at a speed sufficient to prevent burning through of the web. Conversely, it will be understood that if the temperature of the bars is not high enough or if the web is pulled too quickly past the bars, the web will be insufficiently heated to effect weakening of the web.

It will be seen that upon stoppage or undue slowdown of the rate of travel of web 10, rollers 17 and 21 may be pivoted away from web 10, thus causing web 10 to disengage from heaters 13 and 14, therefore preventing burn through of the film.

The present invention may be illustrated further by the following example:

A web of VALERON TM two-ply cross-lapped polyethylene film having a thickness of about 86 μm and 11.4 cm wide was pulled from an unwind stand, capable of pulling the web of film at speeds of up to 78 m/min. Heating bars 13 and 14 were 51 mm long and 6 mm in diameter and were separated by an axial distance of 15 cm. They were SBS sealing bars manufactured by Universal Machinery Corp., available through Pneuma-Flo Systems Inc., Yonkers, New York.

Breaking strength of the web of film was measured in accordance with the procedure of ASTM D882-67 Method A, using an INSTRON TM Break Tester in which a piece of film 11.4 cm by 12.7 cm was held between two pairs of jaws of the Break Tester. The heat-weakened line on the film samples was placed between the pairs of jaws and perpendicularly to the direction of travel of the jaws. The jaws were driven apart at a rate of 5.08 mm/sec and the force required to break the film was measured. The break was visually inspected in addition.

Propagation strength was also measured using a similar procedure to that for measuring breaking strength except that a 2.5 cm cut was made along the heat-weakened line in the center of the film sample.

The results are shown in the table below:

TABLE

| Run No. | Web Speed (m/min) | Current to Each Heating Bar (A) | Breaking Strength (N/cm width) | Propagation Strength (N/cm width) |
|---|---|---|---|---|
| 1 (Sample A) | 76.2 | 270 | 50.8 | 17.5 |
| 1 (Sample B) | 76.2 | 270 | 77.1 | 35.0 |
| 2 (Sample A) | 57.9 | 225 | 50.8 | 15.8 |
| 2 (Sample B) | 57.9 | 225 | 38.5 | 12.3 |
| 3 | 39.6 | 200 | 21.0 | 10.5 |
| 4 | 33.5 | 170 | 42.0 | 8.8 |
| 5** | — | — | 232 | 113 |

**Comparison run only: Not heat weakening

Two samples A and B were taken from each of Runs 1 and 2. It will be seen from the samples of Runs 1 and 2 that there may be some variability along the length of film under some conditions. However, the film breaks at the heat-weakened strip and the break propagates along the heat-weakened strip and not along a line of orientation of one of the plies of the film.

I claim:

1. A process for heat-weakening cross-lapped oriented polyolefin film, comprising:
   (a) pulling a web of a cross-lapped oriented polyolefin film, having a thickness between 38 μm and 150 μm, in a longitudinal direction past first and second heat sources, said first and second heat sources being spaced apart from and in line with one another along a line parallel to the direction of travel of the web;
   (b) directing heat from the first heat source to a transversely narrow area on one side of the film;
   (c) directing heat from the second heat source to a second transversely narrow area on the other side of the film, said second transversely narrow area being longitudinally in line with said first transversely narrow area;
   (d) controlling the heat from the first and second heat sources to effect heat-weakening of the film along a strip passing through the first and second transversely narrow area to such an extent that the transverse tensile breaking strength at the heat-weakened strip is in the range of 20 to 100 Newtons per centimeter of length of film.

2. The process according to claim 1 wherein the polyolefin is a polyethylene having a density in the range of 0.935 to 0.970 g/cm³.

3. A process according to claim 1 wherein the cross-lapped oriented polyolefin film is between 60 and 90 μm in thickness.

4. A process according to claim 1 wherein the heat from each heat source is directed to a small area having a width in the range of 1.6 to 7.9 mm.

5. A process according to claim 1, 3 or 4 wherein the cross-lapped oriented polyolefin film is a two-ply film of polyethylene having a density in the range of 0.935 to 0.960 g/cm³.

6. A process according to claims 1, 2 or 4 wherein the film is heated to such an extent that the transverse tensile breaking strength at the heat-weakened strip is in the range of 25 to 45 Newtons per centimeter of length of film.

* * * * *